Nov. 24, 1931.  W. C. CASSON  1,833,408
FOLDING TRUNK RACK
Filed Sept. 26, 1927
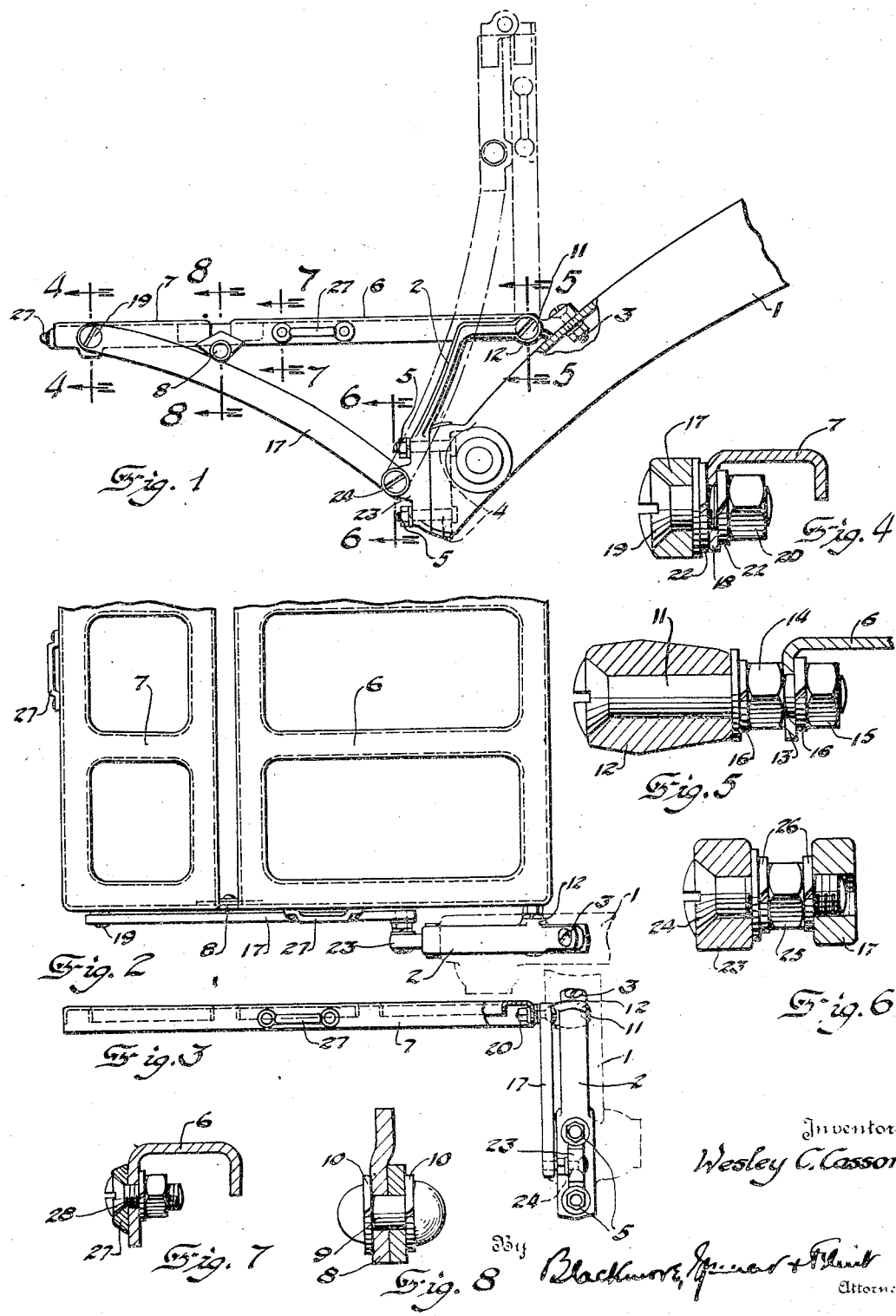
Inventor
Wesley C. Casson Patented Nov. 24, 1931

1,833,408

UNITED STATES PATENT OFFICE

WESLEY C. CASSON, OF WEST LYNN, MASSACHUSETTS, ASSIGNOR TO GENERAL MOTORS CORPORATION, OF DETROIT, MICHIGAN, A CORPORATION OF DELAWARE

FOLDING TRUNK RACK

Application filed September 26, 1927. Serial No. 222,133.

This invention relates to motor vehicles and more particularly to a folding luggage rack for the rear thereof.

The primary object of the invention is to provide a novel and improved support on which a trunk or other luggage of various size and shape may be conveniently carried and which may be neatly and compactly collapsed and moved out of the way when not in use.

In the accompanying drawings wherein is shown a preferred embodiment of the invention Figure 1 is a side elevation of the carrier in extended position secured at the rear end of an automobile chassis frame, the collapsed position of the parts being illustrated by dotted lines. Figures 2 and 3 are fragmentary top plan and rear elevational views respectively, of the rack, showing the attachment connections therefor at one side only, it being understood that the same relation of parts occurs on both sides. Figure 4 is a section on line 4—4 of Figure 1. Figure 5 is a section on line 5—5 of Figure 1. Figure 6 is a section on line 6—6 of Figure 1. Figure 7 is a section on line 7—7 of Figure 1; and Figure 8 is a section on line 8—8 of Figure 1.

Referring to the drawings, the reference character 1 indicates the rear down turned horn of a chassis frame member, one of which extends longitudinally on either side of the vehicle. To this frame member, the carrier forming the subject matter hereof is secured by means of a pair of outwardly and rearwardly extending brackets 2, the upper and forward ends of which are fastened by rivets or bolts 3, to the top flange of the frame member 1, while the lower and rearward portions are secured to flat vertical faces at the rear end of the frame by bolts 4, passing outwardly therethrough, and having fastening nuts 5 screw threaded thereon. The load supporting platform located between the brackets on the two frame members, comprises a pair of sections 6 and 7, joined to each other by a hinge connection 8. The two hinge elements or ears caried by the respective sections 6 and 7, are held together by a rivet 9, so arranged as to permit the hinge to work freely after the riveting operation, and preferably provided with split spring washers 10, which offer slight frictional resistance to the hinge action and also yieldingly hold the parts against rattle.

For economy and convenience of manufacture, the hinged platform sections 6 and 7 may be stamped or otherwise formed from sheet metal, to provide a series of transverse and longitudinal cross bars, the edges of which are turned down, forming reinforcing flanges therefor. The platform has a fixed pivotal connection adjacent the inner end of the innermost section 6, about which the platform may swing to either a substantially horizontal load supporting position or to a substantially vertical inoperative position. When the platform is moved to the last mentioned position, the outer section 7 swings downward about its hinge connection at the free end of the section 6, out of alignment and into substantial parallelism with the section 6 which is then vertically disposed. The fixed pivotal connection for the platform is made with the upper and forward portion of the bracket 2, and comprises a bolt 11 extending inwardly through an enlarged head 12 of the bracket, and through an aperture or opening in the dependent marginal reinforcing flange 13 of the section 6. The bolt 11 carries a spacer nut 14 screw threaded thereon, intermediate the head 12 and flange 13, and a second nut 15 threaded on its end, for holding the parts in assembled relation, together with suitable spring washers 16.

In order to firmly brace the carrier in extended position, the swinging link or brace bar 17 extends on each side thereof, and is pivotally connected with the section 7 adjacent its outer end, from whence it projects downwardly below the platform, to a fixed pivotal connection with the vehicle. The free end of the link or rod 17 is attached to the down-turned marginal flange 18 of the outer section 7, by a stud or bolt 19, having a nut 20 threaded thereon, and which is also provided with suitable spring washers 22. The lower end of the link 17, is interiorly threaded for the reception of a stud or bolt 24, passing through an ear or projection 23, on the lower and rearward portion of the bracket, which bolt carries a spacer nut 25 and spring washers 26 between the link and the ear. As before mentioned, the several spring washers associated with each pivotal connection, serve somewhat as anti-rattling means and also offer a certain amount of frictional resistance for holding the parts in their adjusted positions. In its extended position, the rack provides a flat platform on which a trunk or other article of luggage may be placed, and the swinging links bracing the rack from below offer no obstruction to the accommodation of baggage which may be of greater size than the platform, so as to extend beyond the margins thereof. In order that such articles, regardless of size, may be tied or strapped in position, suitable loop brackets 27 are fastened along the sides of the platform by rivets or bolts 28, for the convenient attachment of hold down straps.

The arrangement of the several parts and the relation of the pivots has been designed to permit a co-operative action therebetween. That is, when the rack is swung to either folded or opened positions, the brace bar 17 and section 6 move about their fixed pivots, while the section 7 pivoted to the free ends of the bars and section 6, has a relative movement about its pivots either into horizontal alignment with the section 6, or into reverse folded position, as the case may be. It will be noted that as the parts approach the collapsed position, the pivot connection at the free end of the link passes dead center or beyond a line drawn through the axes of the rearwardly located fixed pivot and the hinge 8, as is clearly shown by the dotted outline in Figure 1. Obviously, therefore, when the rack is collapsed there will be little or no tendency for the parts to accidentally distend themselves and return to open position under influence of road shocks and the like.

While the device has been described in terms more or less specific, it is to be understood the invention is not limited to exact details, but that such various modifications may be made as come within the scope of the appended claims.

Having described my invention I claim:

1. A folding luggage rack for motor vehicles and the like including a sectional luggage carrying platform, hinge connections between the platform sections, one of the sections having fixed pivotal connection with the vehicle for swinging movement thereabout, a swinging brace bar having fixed pivotal connection with the vehicle and pivotally connected at its free end with the outer section of the platform, said last mentioned pivotal connection being adapted to assume a position intermediate the hinge connections for the sections and pivotal connections for the brace bar and to pass beyond dead center when the rack is swung to folded position to hold the rack in such folded position.

2. A folding luggage rack for motor vehicles and the like, including a pair of hinged luggage supporting sections, adapted to be folded one on the other, the inner section having a fixed pivotal connection with the vehicle, and a link also having a fixed pivotal connection with the vehicle to the rear and below the first mentioned pivotal connection, and being further pivotally connected to the outer luggage supporting section for bracing said sections in extended position, said last mentioned pivotal connection being adapted to pass dead center with respect to the hinge between said sections and the fixed pivot of the link, when said sections are swung about their fixed pivot to folded position, whereby the link serves to hold said sections in such folded position.

3. A folding luggage rack for motor vehicles and the like including rearwardly and downwardly extending brackets fixed to the vehicle, a pair of jointed luggage supporting sections adapted to be folded one on the other, one of the sections being pivoted to the upper portion of the brackets to swing from substantially horizontal extended position to substantially vertical folded position, links pivotally connected to the other section and extending downwardly and having pivotal connection with said brackets below and to the rear of the pivotal connection between the bracket and first mentioned luggage supporting section, the pivotal axis of the luggage supporting section and link connections thereto being movable past a line extending between the pivotal axis of the link and bracket connections and axis of the joint connecting said sections, when said sections are folded, said links thereby serving both to hold said sections in folded position and to brace said sections in extended alignment.

In testimony whereof I affix my signature.

WESLEY C. CASSON.